United States Patent
Saad et al.

(10) Patent No.: US 10,007,626 B1
(45) Date of Patent: Jun. 26, 2018

(54) STORAGE PERFORMANCE TESTING TO EVALUATE MOVING DATA AMONG ARRAYS

(71) Applicant: EMC Corporation, Hopkinton, MA (US)

(72) Inventors: Yossef Saad, Ganei Tikva (IL); Assaf Natanzon, Tel Aviv (IL); Michael Trachtman, Arlington, MA (US)

(73) Assignee: EMC IP Holding Company, Hopkinton, MA (US)

( * ) Notice: Subject to any disclaimer, the term of this patent is extended or adjusted under 35 U.S.C. 154(b) by 190 days.

(21) Appl. No.: 14/980,501

(22) Filed: Dec. 28, 2015

(51) Int. Cl.
G06F 13/362 (2006.01)
G06F 13/42 (2006.01)
G06F 3/06 (2006.01)

(52) U.S. Cl.
CPC ............ *G06F 13/362* (2013.01); *G06F 3/061* (2013.01); *G06F 3/067* (2013.01); *G06F 3/0631* (2013.01); *G06F 3/0647* (2013.01); *G06F 3/0653* (2013.01); *G06F 3/0683* (2013.01); *G06F 13/4221* (2013.01)

(58) Field of Classification Search
CPC .... G06F 13/362; G06F 13/4221; G06F 3/061; G06F 3/0631; G06F 3/0647; G06F 3/0653; G06F 3/067; G06F 3/0683
See application file for complete search history.

(56) References Cited

U.S. PATENT DOCUMENTS

| | | |
|---|---|---|
| 7,155,587 B2 | 12/2006 | Eguchi et al. |
| 7,184,933 B2 | 2/2007 | Prekeges et al. |
| 7,286,967 B2 | 10/2007 | Simes |
| 7,292,969 B1 | 11/2007 | Aharoni et al. |
| 7,328,307 B2 | 2/2008 | Hoogterp |
| 7,356,452 B1 | 4/2008 | Naamad et al. |
| 7,640,231 B2 | 12/2009 | Alvarez et al. |
| 8,046,554 B2 | 10/2011 | Eguchi et al. |
| 8,122,158 B1 | 2/2012 | Kudva et al. |
| 8,583,885 B1 * | 11/2013 | Natanzon ............ G06F 11/2074 711/162 |
| 8,868,797 B1 | 10/2014 | Kirac et al. |
| 8,996,837 B1 * | 3/2015 | Bono ..................... G06F 3/0614 711/114 |
| 9,183,219 B1 * | 11/2015 | Muthirisavenugopal ................. G06F 17/30233 |
| 9,495,269 B1 * | 11/2016 | Hart ...................... G06F 3/0619 |
| 2003/0195960 A1 * | 10/2003 | Merriam ............. G06F 11/3419 709/224 |

(Continued)

*Primary Examiner* — Eric T Oberly
(74) *Attorney, Agent, or Firm* — BainwoodHuang (57) ABSTRACT

A technique evaluates moving a logical unit of storage (LUN). The technique involves adding, while a host accesses a production LUN on a source array, a test LUN on a target array. The technique further involves duplicating host input/output (I/O) requests from the host to form a first set of the host I/O requests for processing on the production LUN on the source array and a second set of the host I/O requests for processing simultaneously on the test LUN on the target array. The technique further involves performing, while the first set of the host I/O requests are processed on the production LUN and the second set of the host I/O requests are processed simultaneously on the test LUN, a performance evaluation on the target array to assess a performance outcome of moving the production LUN from the source array to the target array.

21 Claims, 5 Drawing Sheets

(56) References Cited

U.S. PATENT DOCUMENTS

| | | | |
|---|---|---|---|
| 2013/0246623 A1* | 9/2013 | Seth | G06F 9/5072 709/226 |
| 2013/0262382 A1* | 10/2013 | Kruglick | G06F 17/30079 707/634 |
| 2014/0289458 A1* | 9/2014 | Lassa | G06F 3/0619 711/103 |
| 2015/0066470 A1* | 3/2015 | Chopra | G06F 3/0605 703/20 |
| 2015/0372878 A1* | 12/2015 | Ganesan | H04L 43/16 709/223 |

* cited by examiner

STORAGE PERFORMANCE TESTING TO EVALUATE MOVING DATA AMONG ARRAYS

BACKGROUND

A conventional virtualization device in communication with a data storage array is able to present a logical unit of storage (LUN) on that array to a computerized host device. Additionally, the conventional virtualization device is able to transparently migrate the LUN from one array to another.

For example, suppose that a first array indicates that it is capable of providing a first response time, and that a second array indicates that it is capable of providing a second response time which is faster than the first response time. In such a situation, the conventional storage virtualization device can migrate a LUN from the first array to the second array in an attempt to improve response time to the LUN.

SUMMARY

Unfortunately, there are deficiencies to the above described conventional storage virtualization device. Along these lines, it is possible that there is not the expected improvement in response time after the conventional storage virtualization device migrates a logical unit of storage (LUN) from a first array to a second array. Rather, it is quite possible that additional loading that is put on the second array by the migrated LUN in combination with the earlier loading on the second array results in minimal response time improvement if any. Such a situation may result because simply checking existing performance of an array may not be a good indication of how that array will perform after a LUN has been migrated to that array. In some situations, the response time following LUN migration may even be worse due to additional loading from the LUN that was migrated.

In contrast to the above described conventional approach to migrating a LUN after simply checking existing performance, improved techniques are directed to performing a storage performance test to evaluate moving a LUN. Such techniques involve adding a test LUN to a target array to mimic a real production LUN on a source array, and then assessing performance of the target array under additional loading which mirrors that on the real production LUN. Such an assessment can be performed in real-time and can be made transparent to a set of hosts so that the production work is not interrupted. If the assessment indicates that the additional load would prevent the expected improvement in response time, migration of the LUN can be canceled. However, if the assessment indicates that the expected improvement in response time would still occur even under the additional load, migration of the LUN can be allowed to proceed.

One embodiment is directed to a computer-implemented method of performing a storage performance test to evaluate moving a LUN. The method includes adding, while a set of host computers accesses a production LUN on a source array, a test LUN on a target array. The source array and the target array are different data storage arrays. The method further includes duplicating, after the test LUN is added on the target array, host input/output (I/O) requests from the set of host computers to form a first set of the host I/O requests for processing on the production LUN on the source array and a second set of the host I/O requests for processing simultaneously on the test LUN on the target array. The method further includes performing, while the first set of the host I/O requests are processed on the production LUN on the source array and the second set of the host I/O requests are processed simultaneously on the test LUN on the target array, a set of performance evaluation operations on the target array to assess a performance outcome of moving the production LUN from the source array to the target array.

In some arrangements, performing the set of performance evaluation operations on the target array includes measuring response times for processing the second set of the host I/O requests on the test LUN on the target array. In these arrangements, performing the set of performance evaluation operations further includes outputting an evaluation result based on a comparison of the measured response times to a set of predefined response time criteria.

In some arrangements, the method further includes identifying, prior to duplicating the host I/O requests, a peak usage time window covering a time of day that the target array experiences peak usage. In some arrangements, the peak usage time window is less than 24 hours (e.g., the peak usage time covers a narrow time period within a business day).

In some arrangements, duplicating the host I/O requests includes processing, after the peak usage time window is identified, the second set of the host I/O requests on the test LUN on the target array during the identified peak usage time window. Such an arrangements enables measuring worst case response times when performing the set of performance evaluation operations on the target array.

In some arrangements, adding the test LUN on the target array includes creating the test LUN and copying at least a portion of the production LUN to the test LUN. In some arrangements, duplicating the host I/O requests includes processing the second set of the host I/O requests on the test LUN on the target array while the production LUN and the test LUN are unsynchronized with different host data. In other arrangements, duplicating the host I/O requests includes processing the second set of the host I/O requests on the test LUN on the target array while the production LUN and the test LUN are synchronized with the same host data.

In some arrangements, the evaluation result indicates that the measured response times comply with the set of predefined response time criteria. In these arrangements, the method further includes performing, in response to the evaluation result, a LUN migration commitment operation which copies any remaining portions of the production LUN to the test LUN and commits the set of host computers to using the test LUN on the target array as a new production LUN in place of the production LUN on the source array.

In some arrangements, the method further includes imposing, upon completion of the LUN migration commitment operation, a stabilization threshold which prevents the set of host computers from committing to use another test LUN, as another new production LUN in place of the new production LUN, during a predefined period of time following completion of the LUN migration commitment operation. Such operation prevents the LUN from excessively bouncing among different arrays.

In some arrangements, the source array includes a first set of storage devices configured to provide a first set of access times, and wherein the target array includes a second set of storage devices configured to provide a second set of access times which is faster than the first set of access times. In such arrangements, the performance improvement may be attributable at least in part to the faster access times of the target array (e.g., due to faster storage devices, due to an advanced architecture, etc.).

In some arrangements, the source array includes a first set of storage devices configured to provide a first set of access times, and the target array includes a second set of storage devices configured to provide a second set of access times. Additionally, the first set of access times and the second set of access times are the same. In these arrangements, the performance improvement may be attributable at least in part to there being less loading on the target array.

In some arrangements, the target array includes magnetic disks that initially store a first tenant LUN on behalf of a first tenant. In these arrangements, adding the test LUN on a target array includes creating, on behalf of a second tenant that is different from the first tenant, the test LUN on the magnetic disks that initially store the first tenant LUN so that the test LUN and the first tenant LUN share the magnetic disks in a multi-tenancy configuration.

In some arrangements, the method further includes copying, prior to performing the LUN migration commitment operation, host data from the production LUN to the test LUN in a regulated manner which maintains compliance with a service level agreement in force with the first tenant. Here, the movement of data from the production LUN to the test LUN is prohibited from interfering with the service level agreement in force with the first tenant.

In some arrangements, outputting the evaluation result based on the comparison of the measured response times to the set of predefined response time criteria includes providing an indication as to whether migration of the production LUN to the target array will result in compliance with a service level agreement in force with the second tenant. That is, advantageously, there is confidence that there will be service level agreement compliance following migration due to such testing.

In some arrangements, the evaluation result indicates that the measured response times do not comply with the set of predefined response time criteria. In these arrangements, the method further includes deleting, in response to the evaluation result, the test LUN from the target array to cancel migration of the production LUN from the source array to the target array.

In some arrangements, the method further includes automatically migrating, in response to the evaluation result, the production LUN from the source array to a third array which exclusively stores host data on a set of flash storage devices. The third array is different from the source array and the target array.

In some arrangements, a data storage appliance is interconnected between the set of host computers and the source and target arrays. In these arrangements, the method further includes presenting, by data storage appliance, the production LUN to the set of host computers while hiding the test LUN from the set of host computers.

In some arrangements, presenting the production LUN to the set of host computers while hiding the test LUN from the set of host computers includes returning results of the first set of the host I/O requests to the set of host computers while simultaneously blocking return of results of the second set of the host I/O requests to the set of host computers. Here, the results from the target array can be simply used to measure response times, and can be ignored from the host standpoint. Accordingly, testing of the target array is transparent to the set of host computers and does not interfere with production work.

Another embodiment is directed to data storage equipment which includes memory, and control circuitry coupled to the memory. The memory stores instructions which, when carried out by the control circuitry, cause the control circuitry to:

(A) add, while a set of host computers accesses a production logical unit of storage (LUN) on a source array, a test LUN on a target array, the source array and the target array being different external data storage arrays which are coordinated by the data storage equipment, (B) after the test LUN is added on the target array, duplicate host input/output (I/O) requests from the set of host computers to form a first set of the host I/O requests for processing on the production LUN on the source array and a second set of the host I/O requests for processing simultaneously on the test LUN on the target array, and (C) while the first set of the host I/O requests are processed on the production LUN on the source array and the second set of the host I/O requests are processed simultaneously on the test LUN on the target array, perform a set of performance evaluation operations on the target array to assess a performance outcome of moving the production LUN from the source array to the target array.

Yet another embodiment is directed to a computer program product having a non-transitory computer readable medium which stores a set of instructions to perform a storage performance test to evaluate moving a logical unit of storage (LUN). The set of instructions, when carried out by computerized circuitry, causes the computerized circuitry to perform a method of:

(A) while a set of host computers accesses a production LUN on a source array, adding a test LUN on a target array, the source array and the target array being different data storage arrays;

(B) after the test LUN is added on the target array, duplicating host input/output (I/O) requests from the set of host computers to form a first set of the host I/O requests for processing on the production LUN on the source array and a second set of the host I/O requests for processing simultaneously on the test LUN on the target array; and (C) while the first set of the host I/O requests are processed on the production LUN on the source array and the second set of the host I/O requests are processed simultaneously on the test LUN on the target array, performing a set of performance evaluation operations on the target array to assess a performance outcome of moving the production LUN from the source array to the target array.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in storage performance testing to evaluate moving data among arrays.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to storage performance testing to evaluate moving a logical unit of storage (LUN) among data storage arrays. Such a technique involves adding a test LUN to a target array to mimic a production LUN on a source array, and then assessing performance of the target array under additional loading which mirrors the loading on the production LUN. Such an assessment can be performed in real-time (e.g., even during peak hours for accurate worst case evaluation) and can be made transparent to a set of host devices so that production work is not interrupted. If the performance assessment indicates that the additional load placed on the target array would prevent an expected improvement in response time, movement of the LUN can be canceled. However, if the performance assessment indicates that the additional load would still allow for the expected improvement in response time, movement of the LUN can be allowed to proceed.

As is discussed in further detail herein, such performance testing is further able to determine whether other LUNs on the target array would be damaged by moving the LUN to the target array (e.g., whether another LUN on the target array would be pushed out of compliance with a service level agreement). If it is determined that moving the LUN to the target array would cause performance of another LUN to become unacceptable, the planned move of the LUN to the target array is canceled.

Additionally, as is discussed in further detail herein, smart selection of the target array among multiple candidate arrays can be performed. In particular, an array that has relatively lower load can be selected as the target array since movement of the LUN to that array is likely to result is effective load balancing of the entire data storage environment 20.

Furthermore, as is discussed in further detail herein, it may be determined that the bottleneck is the virtualization layer (e.g., heavy CPU loading of virtualization equipment disposed between the hosts and the actual arrays) rather than the current array. If the bottleneck is the virtualization layer, LUN movement is not performed.

Figure 1:
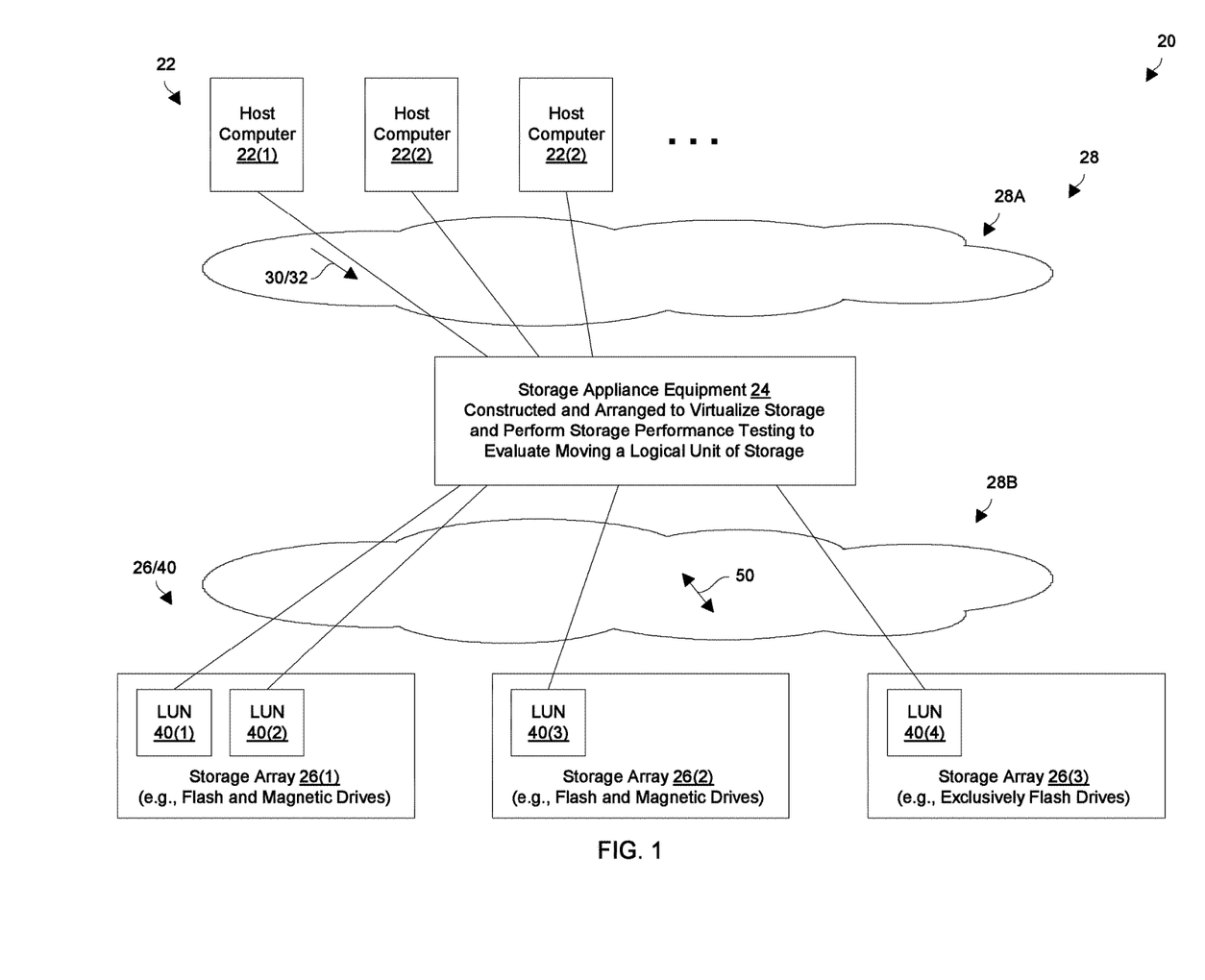
FIG. 1 is a block diagram of a data storage environment which carries out performance testing to evaluate moving a logical unit of storage (LUN) among data storage arrays.

FIG. 1 is a block diagram of a data storage environment 20 which carries out performance testing to evaluate moving a LUN among data storage arrays. The data storage environment 20 includes host computers 22(1), 22(2), 22(3), . . . (collectively, host computers 22), storage appliance equipment 24, data storage arrays 26(1), 26(2), 26(3), . . . (collectively, arrays 26), and communications media 28(A), 28(B) (collectively, communications media 28).

The host computers 22 are constructed and arranged to perform useful work. For example, the host computers 22 may operate as file servers, web servers, email servers, enterprise servers, combinations thereof, and so on, which provide input/output (I/O) requests 30 (e.g., small computer system interface or SCSI commands) to the storage appliance equipment 24 to store data 32 into and read data 32 from the data storage arrays 26.

The storage appliance equipment 24 is constructed and arranged to virtualize storage on the data storage arrays 26. In particular, the storage appliance equipment 24 presents actual LUNs on the arrays 26 as virtual volumes (e.g., virtual disks) to the host computers 22. Accordingly, the host computers 22 are able to communicate with the storage appliance equipment 24 as if the storage appliance equipment 24 was a storage array. In some arrangements, the storage appliance equipment 24 may be formed by multiple individual devices/appliances which are configured as a cluster.

The data storage arrays 26 are actual arrays (e.g., collections of solid state devices, magnetic disk drives, combinations thereof, etc.) that store the data 32. Each data storage array 26 may create and maintain a physical LUN 40 on a local set of storage devices 42, e.g., in a local fast tier of flash memory, in a local medium tier of serial attached SCSI (SAS) drives, and in a local slower tier of near line SAS drives, etc.

By way of example only, the data storage array 26(1) initially includes LUN 40(1) and LUN 40(2). Additionally, the data storage array 26(2) initially includes LUN 40(3). Furthermore, the data storage array 26(3) initially includes LUN 40(4)

The communications medium 28 is constructed and arranged to connect the various components of the data storage environment 20 together to enable these components to exchange electronic signals 50 (e.g., see the double arrow 50) such as storage-based signals, network-based signals, combinations thereof, etc. At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

In some arrangements, the communications medium 28A carries IP-based communications while the communications medium 28B carries block-based (e.g., SCSI) communications. In other arrangements, both the communications medium 28A and the communications medium 28B carry TCP/IP-based communications. In yet other arrangements, both the communications medium 28A and the communications medium 28B carry block-based communications. Other combinations and/or configurations are suitable for use as well.

During operation, the host computers 22 send I/O requests 30 to the storage appliance equipment 24 for processing. Such I/O requests 30 may direct the storage appliance equipment 24 to read host data 32 from a particular LUN 40, write host data 32 to a particular LUN 40, and so on. During such operation, the actual location of the host data 32 may be unknown to the host computers 22. Moreover, during such operation, the storage appliance equipment 24 may transparently relocate the host data 32 from one array 26 to another array 26 (e.g., LUN migration) for various reasons such as to maintain certain access times in compliance with a service level agreement (SLA) for that host data 32 (e.g., data access speeds which are less than or equal to 5 milliseconds).

At this point, it should be understood that the storage appliance equipment 24 is capable of carrying out storage performance testing to evaluate moving a LUN 40 among the data storage arrays 26. Such testing involves adding a test LUN 40 to a target array 26 to mimic a production LUN 40 on a source array 26, and then accurately assessing performance of the target array 26 under additional loading which mirrors the loading on the production LUN 40. The storage appliance equipment 24 ensures that performance testing as well as possible eventual movement of the production LUN 40 to the target array will not disrupt any existing LUNs 40 on the target array 26 (e.g., the storage appliance equipment 24 verifies that any existing LUNs 40 will remain compliant with their respective SLAs). If the performance assessment indicates that the additional load placed on the target array 26 would prevent an expected improvement in response time, movement of the production LUN 40 can be canceled. However, if the performance assessment indicates that the additional load would still allow for the expected improvement in response time, movement of the production LUN 40 from the source array 26 to the target array 26 can be allowed to proceed.

Moreover, the storage appliance equipment 24 may determine that the bottleneck is not due to loading on the source array 26. For example, the bottleneck may be due to heavy CPU loading of the storage appliance equipment 24. In response to such detection, the storage appliance equipment 24 does not perform movement of the LUN 40. Further details will now be provided with reference to FIG. 2.

Figure 2:
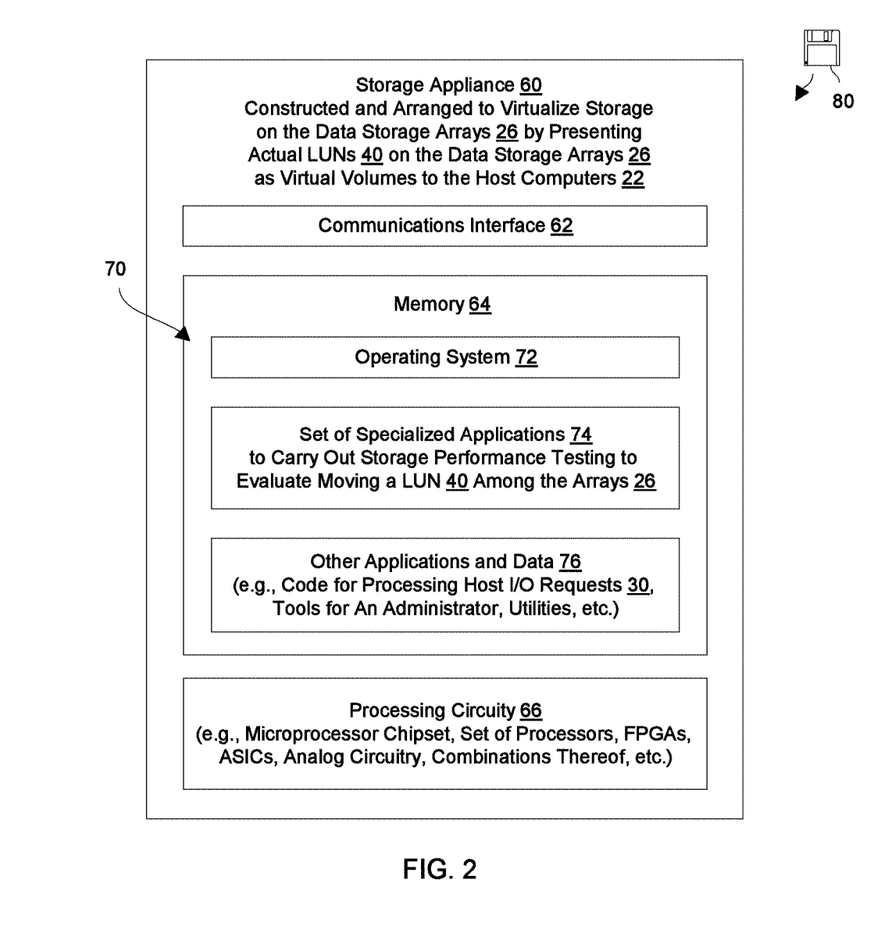
FIG. 2 is a block diagram of a particular apparatus of the data storage environment of FIG. 1.

FIG. 2 shows particular details of a storage appliance 60 which is suitable for use as the storage appliance equipment 24 (FIG. 1) that carries out storage performance testing to evaluate moving a LUN 40 among the arrays 26. In some arrangements, the storage appliance equipment 24 may be formed by multiple storage appliances 60 configured as a cluster. As shown in FIG. 2, the storage appliance 60 includes a communications interface 62, memory 64, and processing circuitry 66.

The communications interface 62 is constructed and arranged to connect the storage appliance 60 to the communications medium 28 (also see FIG. 1) to enable communications with other devices of the data storage environment 20 (e.g., the host computers 22, the data storage arrays 26, etc.). Such communications may be IP-based, SAN-based, cellular-based, cable-based, fiber-optic based, wireless, combinations thereof, and so on. Accordingly, the communications interface 62 enables the storage appliance 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72 to manage resources of the storage appliance 60 (e.g., processor cycles, memory space, etc.), a set of specialized applications 74 to carry out storage performance testing to evaluate moving a LUN 40 among the arrays 26, and other applications and data 76 (e.g., code for processing host I/O requests 30, code to coordinate operation with other storage appliances 60 in a clustered formation, data storage configuration and management tools, administrative utilities, other data storage and/or user-level applications, and so on). The memory 64 may also operate as a cache for host data 32 that is en route between the host computers 22 and the arrays 26.

The processing circuitry 66 is constructed and arranged to operate in accordance with the various software constructs 70 stored in the memory 64. As will be explained in further detail shortly, the processing circuitry 66 executes the set of specialized applications 74 to form specialized control circuitry that controls movement of LUNs 40 among the arrays 26. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the storage appliance 60. In particular, the computer program product 80 has a non-transitory (or non-volatile) computer readable medium which stores a set of instructions which controls one or more operations of the storage appliance 60. Examples of suitable computer readable storage media include tangible articles of manufacture and apparatus which store instructions in a non-volatile manner such as CD-ROM, flash memory, disk memory, tape memory, and the like.

During operation, the storage appliance 60 performs useful work. Along these lines, the storage appliance 60 virtualizes storage on the data storage arrays 26. In particular, the storage appliance 60 presents actual LUNs 40 on the arrays 26 as virtual volumes to the host computers 22. Accordingly, the host computers 22 are able to send host I/O requests 30 to the storage appliance 60 as if the storage appliance 60 was a storage array. In turn, the storage appliance 60 can satisfy the host I/O requests 30 perhaps with participation of one or more of the data storage arrays 26 (e.g., process a host I/O request 30 via a particular data storage array 26, process a host I/O request 30 from a local cache of the storage appliance 60, etc.).

During such operation, the storage appliance 60 may monitor data storage performance of arrays 26. For example, the storage appliance 60 may be part of a cloud storage system which provides storage to multiple tenants (i.e., different customers) in accordance with various SLAs. Along these lines, due to increased loading on the current production array 26 that holds the particular LUN 40, the storage appliance 60 may detect that access times for a particular LUN 40 are gradually approaching a response time requirement that each I/O operation (or that the average I/O operation) must be performed within a certain amount of time such as within 5 milliseconds or less. In response to such detection, the storage appliance 60 may select a target array 26 that is different from the current production array 26, and test that target array 26 to accurately determine whether moving the particular LUN 40 from the current production array 26 to the target array 26 will provide a satisfactory improvement in performance (e.g., an increase in performance by a predefined threshold). If so, the storage appliance 60 transparently moves the particular LUN 40 from the current production array 26 to the target array 26. However, if storage appliance 60 determines that such LUN movement will not provide sufficient improvement in performance or will harm performance of other devices and make their response times non-compliant with policy, the storage appliance 60 does not move the particular LUN 40 from the current production array 26 to the target array 26. Rather, the storage appliance 60 may identify another target array 26 and repeat the above described process. Further details will now be provided with reference to FIGS. 3 and 4.

Figure 3:
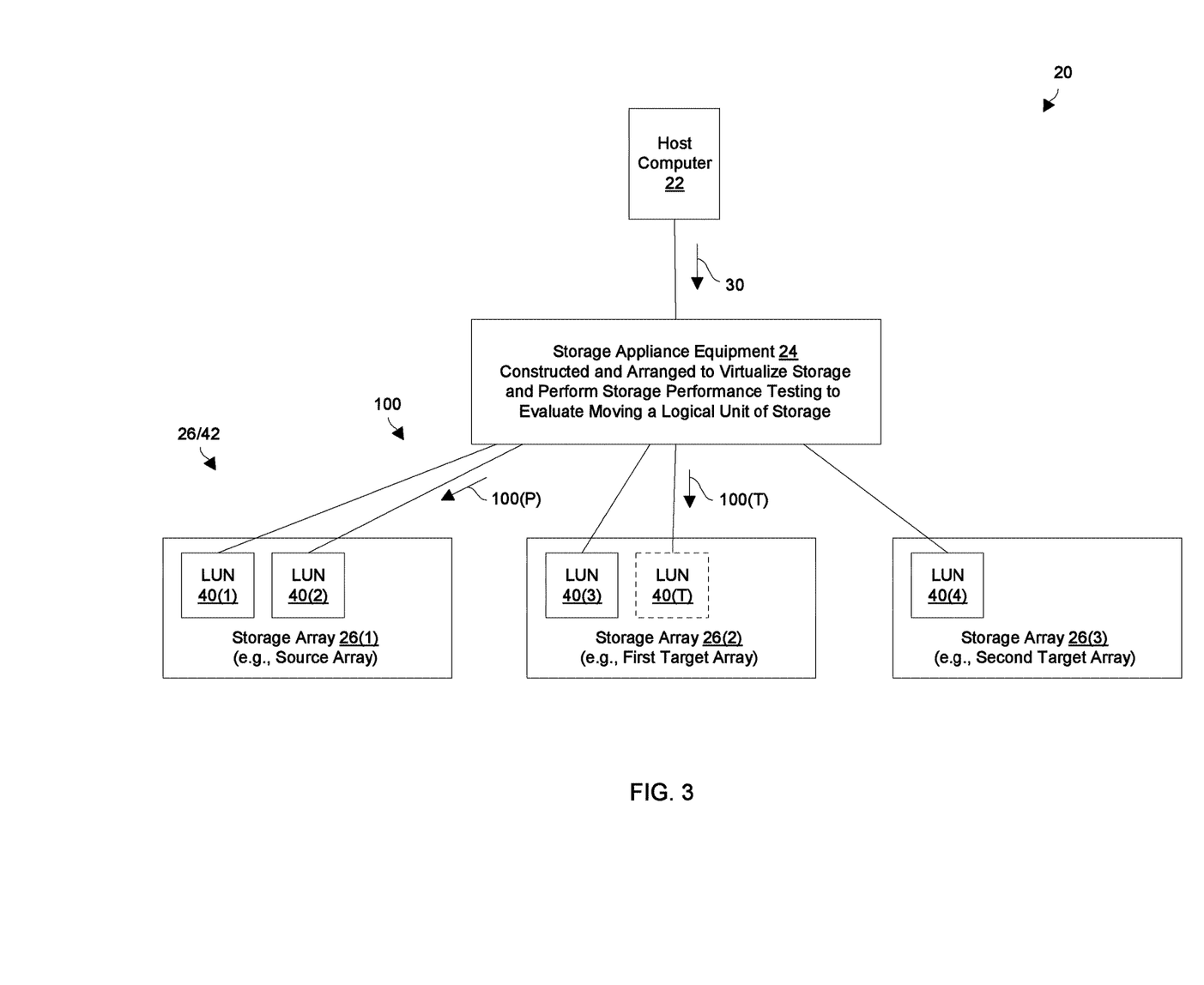
FIG. 3 is a block diagram illustrating particular details of the data storage environment during a storage performance test.
Figure 4:
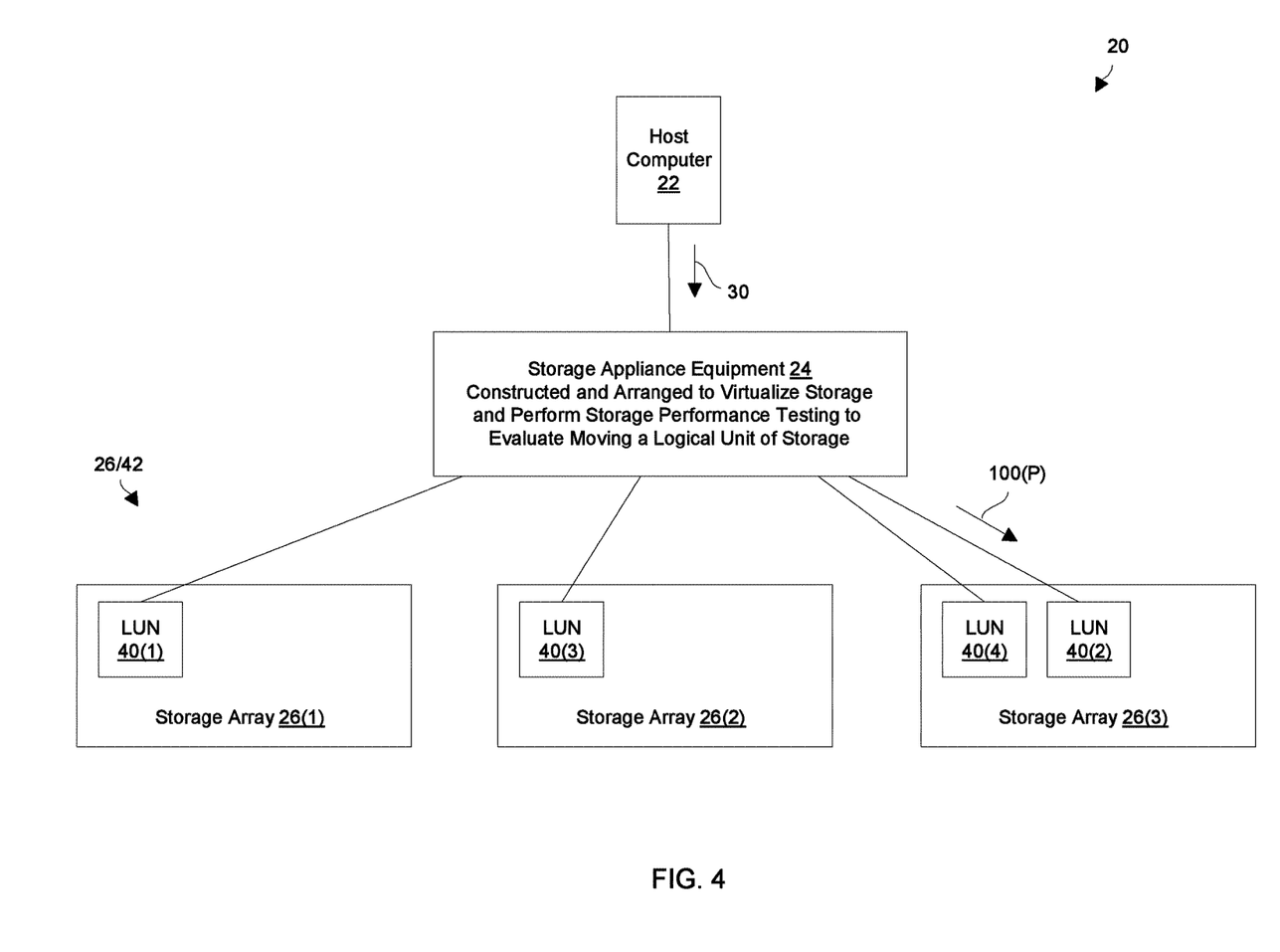
FIG. 4 is a block diagram illustrating particular details of the data storage environment following the storage performance test and once movement of a LUN is completed.

FIGS. 3 and 4 illustrate an example LUN management operation which is performed by the storage appliance equipment 24 of FIG. 1 (also see the storage appliance 60 in FIG. 2). FIG. 3 shows particular details when the storage appliance equipment 24 carries out a storage performance test. FIG. 4 shows particular details when the storage appliance equipment 24 has moved a LUN 40 from one array 26 to another array 26. It should be understood that particular details of the data storage environment 20 (FIG. 1) are omitted from FIGS. 3 and 4 for simplicity.

With attention first directed to FIG. 3, suppose that the host computer 22 accesses a LUN 40(2) on the storage array 26(1) during an initial period of time. During this initial period of time, the host computer 22 sends host I/O requests 30 to the storage appliance equipment 24 which presents the LUN 40(2) to the host computer 22 as a virtual volume. That is, from perspective of the host computer 22, the LUN 40(2) is located at the storage appliance equipment 24 even though the LUN 40(2) is actually located on the array 26(1). Accordingly, the storage appliance equipment 24 may send backend I/O requests 100 (see the arrow 100(P)) to the storage 26(1) to write data into and/or read data from the LUN 40(2) on the array 26(1).

It should be further understood that, during the initial period of time, the storage appliance equipment 24 monitors response times to the LUN 40(2) to ensure that such response times remain in compliance with a particular SLA. For example, the initial average response times may be 4 milliseconds or less, and the particular SLA may require that the average response times be 5 milliseconds or less.

At some point, the average response times may begin to trend higher. For example, over time, the array 26(1) may experience higher loading (i.e., more backend I/O requests 100 to the LUN 40(2) or perhaps to other LUNs 40 located on the array 26(1) such as the LUN 40(1)). Other factors may contribute to the increase in average response time as well such as data displacement from a fast tier of storage devices 42 (e.g., a tier of flash memory) to a slower tier of storage devices 42 (e.g., a tier of magnetic disk drives) on the array 26(1). During this time, the storage appliance equipment 24 continues to monitor response times to the LUN 40(2) on the array 26(1). For example, the average response times may have increased to 4.5 milliseconds.

In this example, suppose that the storage appliance equipment 24 automatically determines that the LUN 40(2) should be moved to another array 26 in order to ensure continued compliance with the SLA. For example, the average response times to the LUN 40(2) may have exceeded a predefined threshold (e.g., 4.7 milliseconds, 4.8 milliseconds, etc.). Alternatively, the storage appliance equipment 24 may perform an estimation based on the rate of increase in response times and determine that load growth will cause non-compliance in 5 days so that the LUN 40(2) must be moved to faster array 26(1) before that time. Other trigger mechanisms are suitable for use as well.

Once the storage appliance equipment 24 determines that the LUN 40(2) should be moved to a new array 26, the LUN 40(2) starts a LUN movement process to relocate the LUN 40(2) to another storage array 26 that more easily supports the particular SLA (e.g., to reduce the response times for the LUN 40(2) to below a predefined threshold such as 4 milliseconds or less). In some arrangements, the storage appliance equipment 24 provides an alert to a human administrator prompting the administrator to approve the LUN movement process. In other arrangements, the storage appliance equipment 24 simply carries out the LUN movement process automatically.

At the beginning of the LUN movement process, the storage appliance equipment 24 identifies a target array 26 to receive the LUN 40(2). Along these lines, the storage appliance equipment 24 may select an array that currently has relatively low loading since movement of the LUN 40 to that array is likely to result is effective load balancing. Such smart candidate selection may be based on available storage space on the other arrays 26, designated response times for the other arrays 26, other capacity criteria, prioritization that is specified by the human administrator, combinations thereof, and so on. In some situation, the location on the target array may be a pool of slices that is already shared with another LUN 40 owned by another tenant (e.g., potential co-tenancy).

In this example, suppose that the storage appliance equipment 24 chooses the storage array 26(2) as the target array 26. As shown in FIG. 3, the storage array 26(2) further holds a LUN 40(3) which may be accessed by the host computer 22 or other host computers 22 which are not shown in FIG. 3 (also see FIG. 1).

At this point, one should appreciate that superficially it may appear that moving the LUN 40(2) from the array 26(1) to the array 26(2) will provide the expected improvement in performance (e.g., a reduction in average response time to 4 milliseconds or less). To obtain more certainty, the storage appliance equipment 24 creates a test LUN 40(T) on the array 26(2).

In some arrangements, the storage appliance equipment 24 copies at least some of the data from the LUN 40(2) to the test LUN 40(T). Here, the copy operations can be throttled/controlled so that there is no significant reduction in response times to the arrays 26(1) and 26(2). Accordingly, compliance with the SLA is maintained. In these arrangements, read operations may be more realistic (i.e., read operations result in reading actual data). Also, in these arrangements, copying data from the LUN 40(2) to the test LUN 40(T) may alleviate the need to copy that data again if the decision is eventually made to move the LUN 40(2) to the array 26(2).

After the test LUN 40(T) has been created, the storage appliance equipment 24 generates multiple backend I/O requests 100 in response to each host I/O request 30 received from the host computer 22. In particular, the storage appliance equipment 24 continues to send backend I/O requests 100(P) to the array 26(1) for processing on the LUN 40(2) which is the production LUN. Additionally, the storage appliance equipment 24 sends backend I/O requests 100(T) to the array 26(2) for processing on the test LUN 40(T).

It should be understood that such I/O request mirroring is transparent to the host computer 22. That is, the host computer 22 continues to send host I/O requests 30 to the storage appliance equipment 24, and the storage appliance equipment 24 sends backend I/O requests 100(P) for processing on the LUN 40(2) of the array 26(1). Furthermore, the results of such processing are provided to the host computer 22. Accordingly, the host computer continues to encounter response times associated with the LUN 26(2) of the array 26(1) (e.g., response times around 4.5 milliseconds).

However, transparent to the host computer 22, the storage appliance equipment 24 concurrently sends backend I/O requests 100(T) for processing on the LUN 40(T) of the array 26(2). Also, the storage appliance equipment 24 blocks the results of backend I/O requests 100(T) from reaching the host computer 22. Accordingly, the storage appliance equipment 24 is able to accurately measure actual response times associated with performing the same operations on the LUN 40(T) of the array 26(2). It is quite possible that the actual response times to the LUN 40(T) of the array 26(2) are significantly poorer than desired or expected response times due to the additional loading placed on the array 26(2) by the backend I/O requests 100(T).

It should be kept in mind that the array 26(2) includes another LUN 40(3) (by way of example only) which may contribute to the poorer performance (e.g., increases in I/O traffic to the array 26(2)). Moreover, while testing using the test LUN is performed, the storage appliance equipment 24 is able to refrain from sending backend I/O requests 100(T) to the array 26(2) if sending these backend I/O requests 100(T) to the array 26(2) would otherwise cause non-compliance of a service level agreement regarding the LUN 40(3).

Such performance measuring of the test LUN 40(T) may continue for a predefined period (e.g., an hour, a day, etc.). In some arrangements, the storage appliance equipment 24 tracks the time of day when each array 26 encounters peak I/O traffic and purposefully performs testing and performance measuring during such a peak time period to ascertain performance under worst case conditions. Along these lines, the average response time during a narrow time window of peak usage (e.g., an hour, less than 24 hours, etc.) is measured to accurately identify worst case response times. In some arrangements, such measurements are performed while the data on the test LUN 40(T) is synchronized with the LUN 26(2).

If the results of such performance measuring indicate that the desired or expected response times would be achieved by moving the LUN 40(2) to the array 26(2), the storage appliance equipment 24 moves the LUN 40(2) from the array 26(1) to the array 26(2). For example, the measurements may indicate that the average response times for the test LUN 40(T) on the array 26(2) are 4.1 milliseconds and the storage appliance equipment 24 is looking for an improvement to 4.2 milliseconds or less. As shown in FIG. 3, if the LUN 40(2) is moved to the array 26(2), the LUN 40(2) can share a slice pool with another LUN 40(3) perhaps even owned by a different tenant (i.e., co-tenancy).

Since the host computer 22 does not know the actual location of the LUN 40(2), and simply sends the host I/O requests 30 to the storage appliance equipment 24, the movement of LUNs 40 among the arrays 26 is transparent to the host computer 22. In some arrangements, the storage appliance equipment 24 deletes the test LUN 40(T) and then migrates the LUN 40(2) from the array 26(1) to the array 26(2). In other arrangements, the storage appliance equipment 24 continues to copy data from the LUN 40(2) on the array 26(1) to the test LUN 40(T) on the array 26(2) if necessary (i.e., until the test LUN 40(T) is synchronized with the LUN 40(2)), and then commits to using the test LUN 40(T) as the production LUN in place of the original LUN 40(2).

It should be understood that the storage appliance equipment 24 is able to impose a minimum amount of time before the production LUN can be moved again. As a result, the production LUN will not excessively bounce from one array to another.

However, if the results of such performance measuring indicate that there is not the desired or expected response times to the test LUN 40(T) on the array 26(2), the storage appliance equipment 24 cancels movement of the LUN 40(2) to the array 26(2). Here, the storage appliance equipment 24 has not yet committed to using the array 26(2), and can delete the test LUN 40(T). In this situation, the storage appliance equipment 24 can restart the LUN movement process using a different array 26 (e.g., the array 26(3) in FIG. 3). Alternatively, the storage appliance equipment 24 can automatically move the LUN 40(2) to an array 26 which is specified by default (e.g., an array 26 which is provisioned fully with flash memory as a safeguard to ensuring compliance with the SLA). Other alternatives are suitable for use as well (e.g., sending an alert to the human administrator, attempting migration to a different storage tier or a different RAID group on the same array 26 or a different array 26, combinations thereof, etc.).

FIG. 4 shows the LUN 40(2) moved from the array 26(1) to another array 26(2) after the LUN movement process accurately indicates that movement of the LUN 40(2) to the array 26(2) would not provide the desired/expected improvement in response time. Such operation prevents the storage appliance equipment 24 from providing ineffective performance improvement which would have otherwise been the case if the storage appliance equipment 24 had blindly moved the LUN 40(2) to the array 26(2). Instead, such operation provides the desired/expected improvement in response time with greater certainty. Further details will now be provided with reference to FIG. 5.

Figure 5:
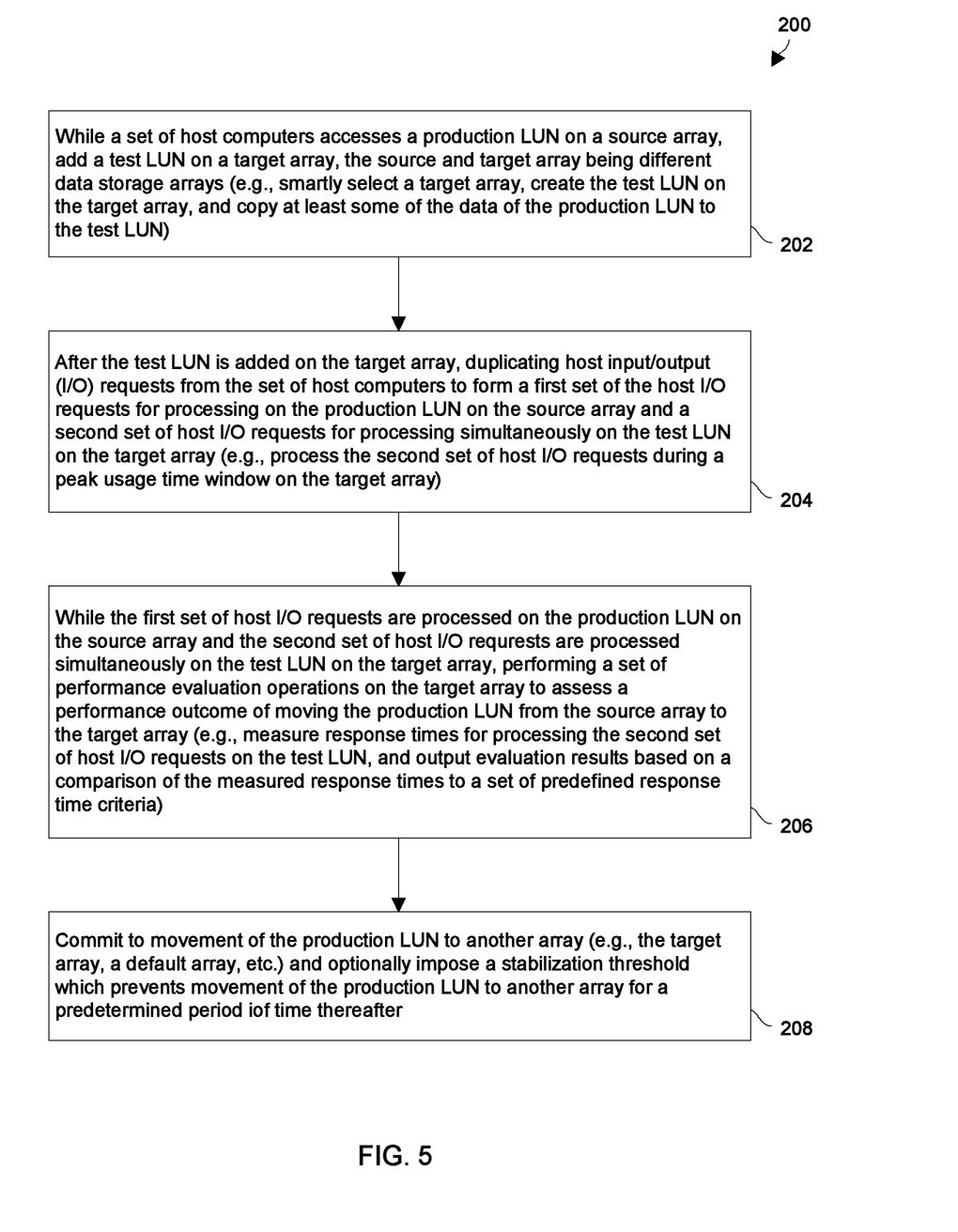
FIG. 5 is a flowchart of a procedure which is performed by the data storage environment of FIG. 1.

FIG. 5 is a flowchart of a procedure 200 which is performed by circuitry of the data storage environment 20 to evaluate moving a LUN 40 among data storage arrays 26. In particular, the procedure involves performing a storage performance test to make such an evaluation.

At 202, the circuitry adds, while a set of host computers accesses a production LUN on a source array, a test LUN on a target array. The source array and the target array are different data storage arrays of the data storage environment 20 (also see FIG. 3). Along these lines, the circuitry may choose, as the target array, an array that has relatively low loading. For example, the circuitry can create the test LUN and copy at least some of the data of the production LUN to the test LUN.

At 204, the circuitry duplicates, after the test LUN is added on the target array, host I/O requests from the set of host computers to form a first set of the host I/O requests for processing on the production LUN on the source array and a second set of the host I/O requests for processing simultaneously on the test LUN on the target array. In particular, the circuitry can process the second set of the host I/O requests on the test LUN on the target array during the identified peak usage time window to measure worst case response times when performing the set of performance evaluation operations on the target array.

At 206, the circuitry performs, while the first set of the host I/O requests are processed on the production LUN on the source array and the second set of the host I/O requests are processed simultaneously on the test LUN on the target array, a set of performance evaluation operations on the target array to assess a performance outcome of moving the production LUN from the source array to the target array. In particular, the circuitry measures response times for processing the second set of the host I/O requests on the test LUN on the target array, and outputs evaluation results based on a comparison of the measured response times to a set of predefined response time criteria. Here, the circuitry additionally verifies that existing LUNs on the target array will not be hampered by movement of the production LUN to the target array (e.g., the existing LUNs will remain compliant with their respective SLAs).

At 208, the circuitry commits to movement of the production LUN to another array (e.g., the target array, a default array, etc.). Here, the circuitry may impose a stabilization threshold which prevents the set of host computers from committing to use another test LUN, as another new production LUN in place of the new production LUN, during a predefined period of time following completion of the LUN migration commitment operation. Such operation prevents the production LUN from moving too frequently (e.g., "bouncing") from one array to another which can waste resources.

As described above, improved techniques are directed to performing a storage performance test to accurately evaluate moving a LUN 40. Such techniques involve adding a test LUN 40(T) to a target array 26 to mimic a real production LUN on a source array 26, and then assessing performance of the target array 26 under additional loading which mirrors that on the real production LUN 40. Such an assessment can be performed in real-time and can be made transparent to a set of host computers 22 so that the production work is not interrupted. If the assessment indicates that the additional load would prevent the expected improvement in response time, migration of the LUN 40 can be canceled. However, if the assessment indicates that the expected improvement in response time would still occur even under the additional load, migration of the LUN 40 can be allowed to proceed.

One should appreciate that data may be constantly moved from one storage location to another, for various reasons, such as technology refresh, tiering and/or migrations. However, without accurate storage performance testing, there is no certainty that an array will operate as expected after the data is moved to it. For example, the array may not be able to carry the additional load. As disclosed herein, real-time performance testing of storage can be done using a storage virtualization layer. In particular, the virtualization layer duplicates I/O operations (e.g., writes/reads/etc.) coming from/to the host to both the existing location (e.g., a production LUN) and a possible new/future location, and over time measures the response time of the new storage location. The measured response times can be analyzed and provide a clear picture of the performance that could be expected from the new storage location, before committing to the new storage location and without interrupting the production work. Such techniques provide performance analysis that accurately reflects storage behavior after the data is moved.

One should further appreciate that the above-described techniques do not merely select LUNs or other objects. Rather, the disclosed techniques involve adding a test LUN 40 to a target array 26 to assess whether to move a production LUN 40 to the target array 26. With such improvements to data storage technology, other advantages are available as well such as effective virtualization of volumes (e.g., effective movement of LUNs to improve response time), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Additionally, it should be understood that a variety of different thresholds are suitable for use by the data storage environment 20. For example, one threshold can define when to perform the LUN movement process, another threshold may apply to response times for write operations, another threshold may apply to response times for read operations, another threshold may apply to average response times, another threshold may apply to the worst case response time, and so on. Furthermore, threshold values which are different than those provided in the examples above are also suitable for use. Moreover, such thresholds, behaviors, requirements, etc. can be defined within a service level agreement (SLA), e.g., a requirements document between a cloud service provider and a tenant.

Furthermore, it should be understood that, in some arrangements, the circuitry of the data storage environment 20 evaluates multiple target arrays simultaneously. In such arrangements, the circuitry applies predefined selection criteria to select the best target array among the candidate target arrays, and positions/moves the LUN to the best target array based on the predefined selection criteria.

Additionally, in some arrangements, the circuitry of the data storage environment 20 is configured to select, as the target array, a lower performing array. In these arrangements, the circuitry transfers the LUN to another array which still satisfies the needs of that LUN (e.g., maintains SLA compliance) thus freeing resources on the source array for other activities (e.g., to support other LUNs). Moreover, one should appreciate that there may be non-performance reasons for moving LUNs among arrays (e.g., tech refresh, legal or accounting reasons, multi-tenancy restrictions, etc.) and the circuitry disclosed herein is suitable for handling such activities. Such modifications and enhancements are intended to belong to various embodiments of the disclosure.

What is claimed is:

1. A computer-implemented method of performing a storage performance test to evaluate moving a logical unit of storage (LUN), the computer-implemented method comprising:

while a set of host computers accesses a production LUN on a source array, adding a test LUN on a target array, the source array and the target array being different data storage arrays;

after the test LUN is added on the target array, duplicating host input/output (I/O) requests from the set of host computers to form a first set of the host I/O requests for processing on the production LUN on the source array and a second set of the host I/O requests for processing simultaneously on the test LUN on the target array; and while the first set of the host I/O requests are processed on the production LUN on the source array and the second set of the host I/O requests are processed simultaneously on the test LUN on the target array, performing a set of performance evaluation operations on the target array to assess a performance outcome of moving the production LUN from the source array to the target array;

wherein a data storage appliance is interconnected between the set of host computers and the source and target arrays; and wherein the computer-implemented method further comprises:

presenting, by the data storage appliance, the production LUN to the set of host computers while hiding the test LUN from the set of host computers.

2. A computer-implemented method as in claim 1 wherein performing the set of performance evaluation operations on the target array includes:

measuring response times for processing the second set of the host I/O requests on the test LUN on the target array, and outputting an evaluation result based on a comparison of the measured response times to a set of predefined response time criteria.

3. A computer-implemented method as in claim 2, further comprising:

prior to duplicating the host I/O requests, identifying a peak usage time window covering a time of day that the target array experiences peak usage, the peak usage time window being less than 24 hours.

4. A computer-implemented method as in claim 3 wherein duplicating the host I/O requests includes:

after the peak usage time window is identified, processing the second set of the host I/O requests on the test LUN on the target array during the identified peak usage time window to measure worst case response times when performing the set of performance evaluation operations on the target array.

5. A computer-implemented method as in claim 2 wherein adding the test LUN on the target array includes:

creating the test LUN and copying at least a portion of the production LUN to the test LUN.

6. A computer-implemented method as in claim 5 wherein duplicating the host I/O requests includes:

processing the second set of the host I/O requests on the test LUN on the target array while the production LUN and the test LUN are unsynchronized with different host data.

7. A computer-implemented method as in claim 5 wherein duplicating the host I/O requests includes:

processing the second set of the host I/O requests on the test LUN on the target array while the production LUN and the test LUN are synchronized with the same host data.

8. A computer-implemented method as in claim 2 wherein the evaluation result indicates that the measured response times comply with the set of predefined response time criteria; and wherein the computer-implemented method further comprises:

in response to the evaluation result, performing a LUN migration commitment operation which copies any remaining portions of the production LUN to the test LUN and commits the set of host computers to using the test LUN on the target array as a new production LUN in place of the production LUN on the source array.

9. A computer-implemented method as in claim 8, further comprising:

upon completion of the LUN migration commitment operation, imposing a stabilization threshold which prevents the set of host computers from committing to use another test LUN, as another new production LUN in place of the new production LUN, during a predefined period of time following completion of the LUN migration commitment operation.

10. A computer-implemented method as in claim 8 wherein the source array includes a first set of storage devices configured to provide a first set of access times; and wherein the target array includes a second set of storage devices configured to provide a second set of access times which is faster than the first set of access times.

11. A computer-implemented method as in claim 8 wherein the source array includes a first set of storage devices configured to provide a first set of access times;

wherein the target array includes a second set of storage devices configured to provide a second set of access times; and wherein the first set of access times and the second set of access times are the same.

12. A computer-implemented method as in claim 2 wherein the target array includes magnetic disks that initially store a first tenant LUN on behalf of a first tenant; and wherein adding the test LUN on a target array includes:

on behalf of a second tenant that is different from the first tenant, creating the test LUN on the magnetic disks that initially store the first tenant LUN so that the test LUN and the first tenant LUN share the magnetic disks in a multi-tenancy configuration.

13. A computer-implemented method as in claim 12, further comprising:

prior to performing the LUN migration commitment operation, copying host data from the production LUN to the test LUN in a regulated manner which maintains compliance with a service level agreement in force with the first tenant.

14. A computer-implemented method as in claim 12 wherein outputting the evaluation result based on the comparison of the measured response times to the set of predefined response time criteria includes:

providing an indication as to whether migration of the production LUN to the target array will result in compliance with a service level agreement in force with the second tenant.

15. A computer-implemented method as in claim 2 wherein the evaluation result indicates that the measured response times do not comply with the set of predefined response time criteria; and wherein the computer-implemented method further comprises:

in response to the evaluation result, deleting the test LUN from the target array to cancel migration of the production LUN from the source array to the target array.

16. A computer-implemented method as in claim 15, further comprising:

in response to the evaluation result, automatically migrating the production LUN from the source array to a third array which exclusively stores host data on a set of flash storage devices, the third array being different from the source array and the target array.

17. A computer-implemented method as in claim 1 wherein presenting the production LUN to the set of host computers while hiding the test LUN from the set of host computers includes:
    returning results of the first set of the host I/O requests to the set of host computers while simultaneously blocking return of results of the second set of the host I/O requests to the set of host computers.

18. Data storage equipment, comprising:
    memory; and
    control circuitry coupled to the memory, the memory storing instructions which, when carried out by the control circuitry, cause the control circuitry to:
        add, while a set of host computers accesses a production logical unit of storage (LUN) on a source array, a test LUN on a target array, the source array and the target array being different external data storage arrays which are coordinated by the data storage equipment,
        after the test LUN is added on the target array, duplicate host input/output (I/O) requests from the set of host computers to form a first set of the host I/O requests for processing on the production LUN on the source array and a second set of the host I/O requests for processing simultaneously on the test LUN on the target array, and
        while the first set of the host I/O requests are processed on the production LUN on the source array and the second set of the host I/O requests are processed simultaneously on the test LUN on the target array, perform a set of performance evaluation operations on the target array to assess a performance outcome of moving the production LUN from the source array to the target array;
    wherein the data storage equipment includes a data storage appliance which is interconnected between the set of host computers and the source and target arrays; and
    wherein the data storage appliance is constructed and arranged to:
        present the production LUN to the set of host computers while hiding the test LUN from the set of host computers.

19. A computer program product having a non-transitory computer readable medium which stores a set of instructions to perform a storage performance test to evaluate moving a logical unit of storage (LUN); the set of instructions, when carried out by computerized circuitry, causing the computerized circuitry to perform a method of:
    while a set of host computers accesses a production LUN on a source array, adding a test LUN on a target array, the source array and the target array being different data storage arrays;
    after the test LUN is added on the target array, duplicating host input/output (I/O) requests from the set of host computers to form a first set of the host I/O requests for processing on the production LUN on the source array and a second set of the host I/O requests for processing simultaneously on the test LUN on the target array; and
    while the first set of the host I/O requests are processed on the production LUN on the source array and the second set of the host I/O requests are processed simultaneously on the test LUN on the target array, performing a set of performance evaluation operations on the target array to assess a performance outcome of moving the production LUN from the source array to the target array;
    wherein the computerized circuitry includes a data storage appliance which is interconnected between the set of host computers and the source and target arrays; and
    wherein the method further includes:
        presenting, by the data storage appliance, the production LUN to the set of host computers while hiding the test LUN from the set of host computers.

20. A computer-implemented method as in claim 1 wherein the host I/O requests from the set of host computers include actual write commands to write actual host data to the source array;
    wherein duplicating the host I/O requests includes:
        based on the actual write commands, generating duplicate write commands to write the actual host data to the target array, the target array writing the actual host data to the target array in response to the duplicate write commands.

21. A computer-implemented method of performing a storage performance test to evaluate moving a logical unit of storage (LUN), the computer-implemented method comprising:
    while a set of host computers accesses a production LUN on a source array, adding a test LUN on a target array, the source array and the target array being different data storage arrays;
    after the test LUN is added on the target array, duplicating host input/output (I/O) requests from the set of host computers to form a first set of the host I/O requests for processing on the production LUN on the source array and a second set of the host I/O requests for processing simultaneously on the test LUN on the target array; and
    while the first set of the host I/O requests are processed on the production LUN on the source array and the second set of the host I/O requests are processed simultaneously on the test LUN on the target array, performing a set of performance evaluation operations on the target array to assess a performance outcome of moving the production LUN from the source array to the target array;
    wherein performing the set of performance evaluation operations on the target array includes:
    measuring response times for processing the second set of the host I/O requests on the test LUN on the target array, and
    outputting an evaluation result based on a comparison of the measured response times to a set of predefined response time criteria;
    wherein the evaluation result indicates that the measured response times do not comply with the set of predefined response time criteria; and
    wherein the computer-implemented method further comprises:
        in response to the evaluation result, deleting the test LUN from the target array to cancel migration of the production LUN from the source array to the target array; and
    wherein the computer-implemented method further comprises:
        in response to the evaluation result, automatically migrating the production LUN from the source array to a third array which exclusively stores host data on a set of flash storage devices, the third array being different from the source array and the target array.

* * * * *